(12) United States Patent
Ahluwalia (10) Patent No.: US 9,788,243 B2
(45) Date of Patent: *Oct. 10, 2017

(54) RESOURCE ALLOCATION IN TARGET CELL AFTER HANDOVER

(71) Applicant: NEC CORPORATION, Tokyo (JP)

(72) Inventor: Jagdeep Singh Ahluwalia, Sutton (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,546

(22) Filed: Jan. 20, 2016

(65) Prior Publication Data

US 2016/0135098 A1   May 12, 2016

Related U.S. Application Data

(63) Continuation of application No. 12/449,306, filed as application No. PCT/JP2008/051889 on Jan. 30, 2008, now Pat. No. 9,282,493.

(30) Foreign Application Priority Data

Feb. 5, 2007 (GB) .................................. 0702169.4

(51) Int. Cl.
  *H04W 4/00* (2009.01)
  *H04W 36/00* (2009.01)
  *H04W 36/02* (2009.01)
  *H04W 28/02* (2009.01)
  *H04W 72/04* (2009.01)

(52) U.S. Cl.
  CPC ... *H04W 36/0055* (2013.01); *H04W 28/0278* (2013.01); *H04W 36/02* (2013.01); *H04W 72/0413* (2013.01); *H04W 72/04* (2013.01)

(58) Field of Classification Search
  CPC ...................................................... H04W 36/00
  USPC ................ 370/236–238, 328–338, 397–428;
     455/436–461, 466
  See application file for complete search history.

(56) References Cited

U.S. PATENT DOCUMENTS

| 5,896,373 A | 4/1999 | Mitts et al. |
| 2003/0125037 A1* | 7/2003 | Bae ....................... H04W 28/22 455/450 |
| 2003/0189909 A1 | 10/2003 | Chao et al. |

(Continued)

FOREIGN PATENT DOCUMENTS

| CN | 1156945 A | 8/1997 |
| CN | 1212112 A | 3/1999 |

(Continued)

OTHER PUBLICATIONS

Communication dated Feb. 25, 2015 from the Japanese Patent Office in counterpart application No. 2014-129336.

(Continued)

*Primary Examiner* — Iqbal Zaidi
(74) *Attorney, Agent, or Firm* — Sughrue Mion, PLLC (57) ABSTRACT

A system is proposed to provide handover in a mobile telecommunications environment, particularly applicable to 3GPP networks, in which a user device, such as a mobile telephone provides a buffer status report to the target base station during a handover procedure. The target base station uses this status report to allocate appropriate resources for uplink data to be transmitted from the user device to the target base station.

4 Claims, 7 Drawing Sheets

(56) References Cited

U.S. PATENT DOCUMENTS

| | | | |
|---|---|---|---|
| 2005/0207374 A1 | 9/2005 | Petrovic et al. | |
| 2006/0280145 A1 | 12/2006 | Revel et al. | |
| 2007/0047493 A1* | 3/2007 | Park | H04W 74/006 370/331 |
| 2008/0254800 A1* | 10/2008 | Chun | H04W 48/12 455/438 |

FOREIGN PATENT DOCUMENTS

| | | |
|---|---|---|
| CN | 1435963 A | 8/2003 |
| CN | 1604687 A | 4/2005 |
| WO | 2004-077871 A1 | 9/2004 |
| WO | 2006/135486 A1 | 12/2006 |
| WO | 2007/052922 A1 | 5/2007 |
| WO | 2007/066882 A1 | 6/2007 |

OTHER PUBLICATIONS

Communication dated May 27, 2015, issued by the Japan Patent Office in corresponding Japanese Application No. 2014-129336.
Resource allocations in target cell after Handover, 3GPP TSG-RAN2 Meeting #59, R2-073349, Aug. 20-24, 2007, NEC, Athens, Greece, 5 pages total.
Samsung, EUL scheduling: signalling support, Discussion and Decision, Sep. 20-24, 2004, 3GPP TSG-RAN WG1 Meeting #38bis, R1-041084, 7 pages total.
Chinese Office Action and Chinese Search Report (with English Translation) dated Mar. 5, 2014.
NEC, Resource allocations in target cell after Handover, 3GPP TSG-RAN WG2#59 bis R2-074276, Oct. 8, 2007, URL, http://3gpp.org/ftp/tsg ran/WG2 RL2/TSGR2 59bis/Docs/R2-074276.zip. Japanese Office Action dated Dec. 7, 2011.
ZTE, intra-RAT handover access procedure, 3GPP TSG-RAN Working Group 2 meeting #52, R2-061229, May 8, 2006, URL, http://www.3gpp.org/ftp/tsg_ ran/WG2_RL2/TSGR2 53/Documents/R2-061229.zip.
Ericsson, LTE Connected Mode Mobility, 3GPP TSG-RAN WG2 #50 R2-060022, Jan. 9, 2006, URL, http://www.3gpp.org/ftp/tsg ran/WG2 RL2/TSGR2 50/Documents/R2-060022.zip.
Japanese Office Action dated Jan. 29, 2014, without English translation.
3GPP TS 36.300 V0.4.0, Jan. 31, 2007, pp. 38-40, URL, http://www.3gpp.org/ftp/Specs/archive/36_series/36.300/36300-040.zip 2 .ZTE, intra-RAT handover access procedure, 3GPP TSG-RAN Working Group 2 meeting #52 R2-061229, May 8, 2006, URL, http//www. 3gpp.org/ftp/tsg_ran/WG2_RL2/TSGR2_53/Documents/R2-061229 zip.
(E-UTRA) and Evolved Universal Terrestrial Radio Access (E-UTRAN); Overall description; Stage 2 (3GPP TS 36.300 Version 0.4.0); ETS1 TS 136 300 ETSI Standards, LIS, Sophia Antipolis Cedex, France, [Onlinej No. V0.4.0, Jan. 31, 2007 (Jan. 31, 2007), XP002485085.
Communication dated Jun. 2, 2017, issued from the State Intellectual Property Office of People's Republic of China in corresponding Application No. 201410686922.2.
Japanese Office Action dated Aug. 30, 2017 in Japanese Patent Application No. 2016-204907.

* cited by examiner

RESOURCE ALLOCATION IN TARGET CELL AFTER HANDOVER

CROSS REFERENCE TO RELATED APPLICATIONS

This application is a Continuation of U.S. application Ser. No. 12/449,306, which is the National Stage of International Application No. PCT/JP2008/051889 filed Jan. 30, 2008, which claims priority from United Kingdom 0702169.4 filed Feb. 5, 2007, the disclosures of which are incorporated herein in their entireties.

TECHNICAL FIELD

The present invention relates to the allocation of resources in a communications system after a communications node has changed association from a source base station to a target base station. The invention has particular although not exclusive relevance to the UL resource allocation in the Long Term Evolution (LTE) of UTRAN (called Evolved Universal Radio Access Network (EUTRAN)) after handover.

BACKGROUND ART

In mobile telecommunications networks, there is a requirement for User Equipment (UE) to handover from one base station to another. The signaling sequence for the intra-LTE handover procedure has been described in 3GPP specification TS 36.300, the content of which is incorporated herein by reference.

DISCLOSURE OF THE INVENTION

However, the specifics on resource allocations in the target cell have not yet been addressed in detail. The various acronyms applicable to 3G communications will of course be familiar to those skilled in the art but a glossary is appended for the benefit of lay readers.

Although for efficiency of understanding for those of skill in the art the invention will be described in detail in the context of a 3G system, the principles of the handover procedure can be applied to other systems, e.g. other CDMA or wireless systems in which a mobile device or User Equipment (UE) communicates with one of several other devices (corresponding to eNodeB) with the corresponding elements of the system changed as required.

According to one aspect, the present invention provides a method performed in a communications device comprising: transmitting uplink data to a source communications node; pausing transmission of uplink data upon receipt of a handover command from the source communications node; buffering uplink data while transmission of the uplink data is paused; synchronising with a target communications node; transmitting to the target node a handover complete message together with a buffer status report indicating an amount of buffered uplink data; and resuming the transmission of the uplink data using resources allocated by the target communications node. As the target node is informed of the buffer level at the end of the handover procedure, the target node can accurately allocate the required uplink resources that are needed by the UE.

The pausing or stopping of the uplink data transmission may be performed simultaneously with the receipt of the handover command or at some point after the handover command has been received. This time point may be defined in advance, for example as a system constant or it may be signaled to the communications device for example in the handover command.

The handover complete message may be the same as the handover confirm message currently defined in the TS36.300 standard or it may be different, for example because the buffer status report is appended thereto.

The method can be used for both inter and intra base station handovers.

The present invention also provides a method performed in a target communications node to facilitate handover of a remote communications device from a source communications node to the target communications node, the method comprising: receiving a handover complete message together with a buffer status report indicating an amount of buffered uplink data within the remote communications device; allocating resources to the remote communications device in dependence upon the received buffer status report; and receiving uplink data from the remote communications device using resources allocated by the target communications node. Preferably the allocating step performs the allocation in dependence upon service data received from the source communications node relating to the service provided to the remote device by the source communications node.

The present invention also provides a communications device comprising: a transceiver for transmitting data to and receiving data from remote communications nodes; a controller operable: to transmit uplink data to a source communications node; to stop transmission of said uplink data upon receipt of a handover command from the source communications node; to buffer uplink data while transmission of the uplink data is stopped; to synchronise with a target communications node; to transmit a handover complete message together with a buffer status report indicating an amount of buffered uplink data; and to transmit uplink data using resources allocated by the target communications node.

The present invention also provides a communications node comprising: a transceiver for transmitting data to and receiving data from a remote communications device; a controller operable: to receive, from a remote communications device, a handover complete message together with a buffer status report indicating an amount of buffered uplink data within the remote communications device: to allocate resources to the remote communications device in dependence upon the received buffer status report; and to receive uplink data from the remote communications device using the allocated resources.

Preferably, the controller allocates the resources in dependence upon service data received from a source communications node relating to a service provided to the remote device by the source communications node.

BRIEF DESCRIPTION OF THE DRAWINGS

These and other features and aspects of the invention will become apparent from the following exemplary embodiments which are described with reference to the accompanying drawings in which.

BEST MODE FOR CARRYING OUT THE INVENTION

Overview

Figure 1:
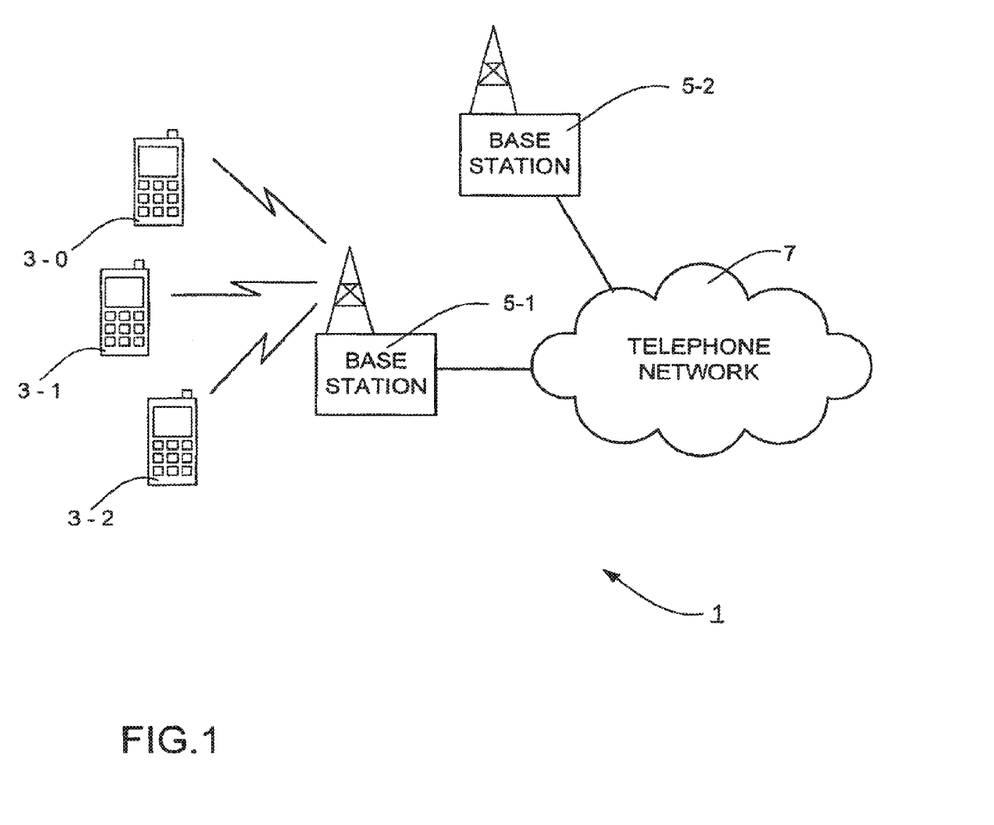
FIG. 1 schematically illustrates a mobile telecommunication system of a type to which the embodiment is applicable.

FIG. 1 schematically illustrates a mobile (cellular) telecommunications system 1 in which users of mobile telephones (MT) 3-0, 3-1, and 3-2 can communicate with other users (not shown) via one of the base stations 5-1 or 5-2 and a telephone network 7. In this embodiment, for the downlink (DL), the base stations 5 use an orthogonal frequency division multiple access (OFDMA) technique to transmit data to the mobile telephones 3 (3-0, 3-1, 3-2); and, for the uplink (UL), the mobile telephones 3 use a single carrier frequency division multiple access (FDMA) technique to transmit data to the base stations 5 (5-1, 5-2). Different sub-carriers are allocated by the base stations 5 to each mobile telephone 3 depending on the supported bandwidth of the mobile telephone 3 and the amount of data to be sent to/from the mobile telephone 3. When a mobile telephone 3 moves from the cell of a source base station (e.g. base station 5-1) to a target base station (e.g. base station 5-2), a handover (HO) procedure (protocol) is carried out in the source and target base stations 5 and in the mobile telephone 3, to control the handover process.

Time/Frequency Resources

In this embodiment, the available transmission band is divided into a number of sub-bands, each of which comprises a number of contiguous sub-carriers arranged in contiguous blocks. Different mobile telephones 3 are allocated different resources block(s) (sub-carriers) within a sub-band at different times for transmitting their data.

Base Station

Figure 2:
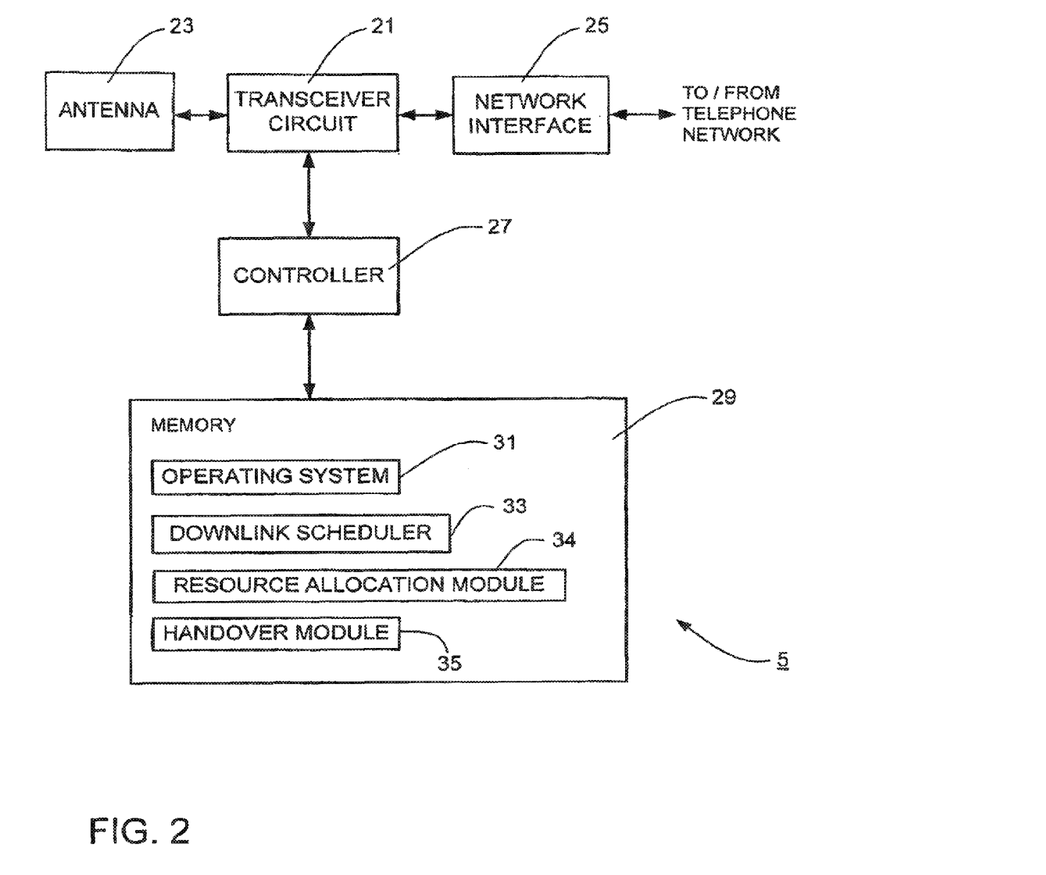
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antenna 23 (using the above described sub-carriers) and which is operable to transmit signals to and to receive signals from the telephone network 7 via a network interface 25. A controller 27 controls the operation of the transceiver circuit 21 in accordance with software stored in memory 29. The software includes, among other things, an operating system 31, a downlink scheduler 33 and a resource allocations module 34. The downlink scheduler 33 is operable for scheduling user data packets to be transmitted by the transceiver circuit 21 in its communications with the mobile telephones 3; and the resource allocations module 34 is operable to allocate frequency resources for use by the mobile telephones 3 for transmitting their uplink data to the base station 5. The software also includes a handover module 35, the operation of which will be described below.

Mobile Telephone

Figure 3:
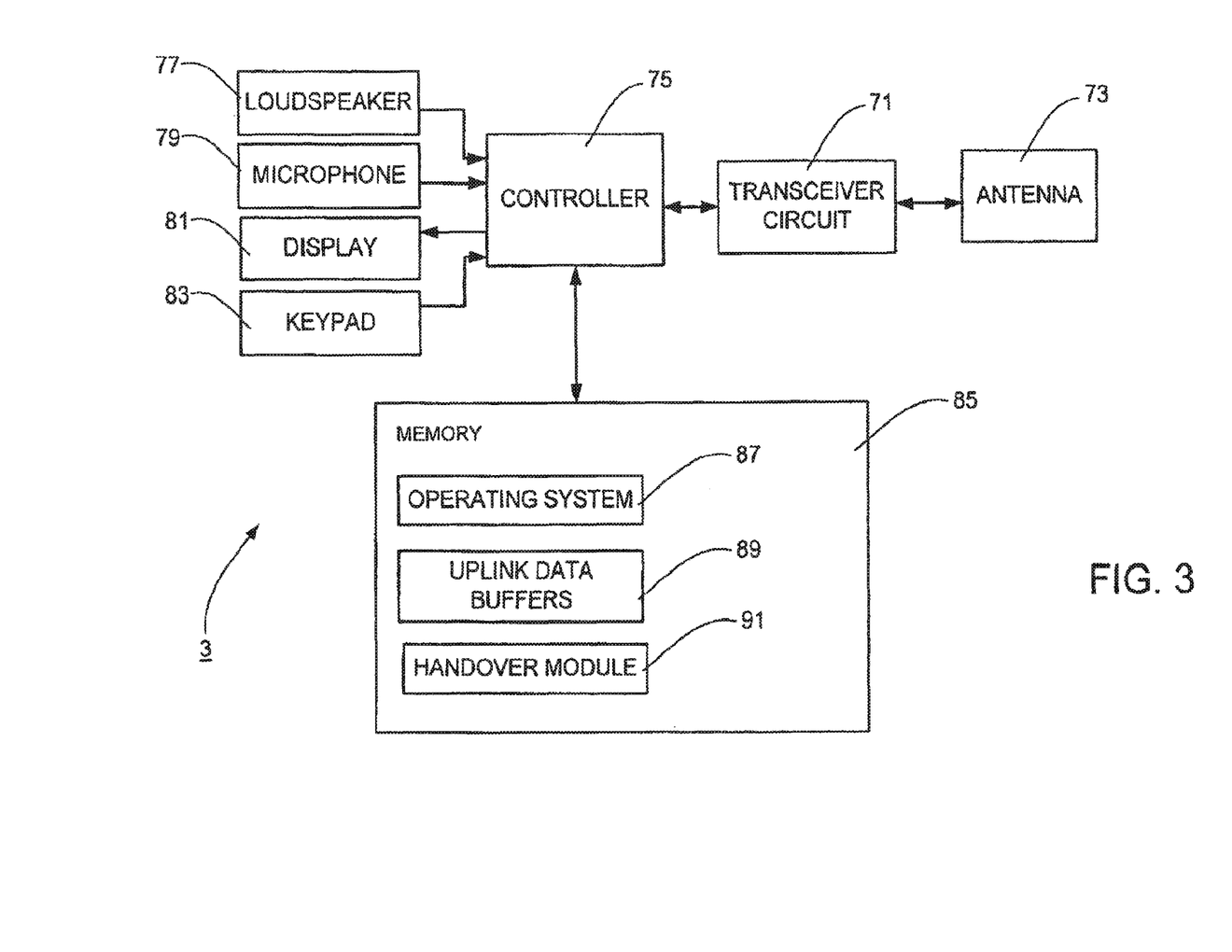
FIG. 3 schematically illustrates a mobile communication device forming part of the system shown in FIG. 1.

FIG. 3 schematically illustrates the main components of each of the mobile telephones 3 shown in FIG. 1. As shown, the mobile telephones 3 include a transceiver circuit 71 that is operable to transmit signals to and to receive signals from the base station 5 via one or more antenna 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87. In this embodiment, the memory also provides uplink data buffers 89. The software for controlling the handover process is provided by a handover module 91, the operation of which will be described below.

In the above description, both the base station 5 and the mobile telephones 3 are described, for ease of understanding, as having respective discrete handover modules which control the handover procedure when a mobile telephone 3 moves from a source base station to a target base station. Whilst the features may be provided in this way for certain applications, for example where an existing system has been modified to implement the invention, in other applications, for example in systems designed with the inventive features in mind from the outset, the handover features may be built into the overall operating system or code and so a handover module as a discrete entity may not be discernible. This is similarly true for the other software modules.

Handover Procedure

A description will now be given of the operation of the handover modules 35 and 91. The following description will use the nomenclature used in the Long Term Evolution (LTE) of UTRAN. Therefore, the mobile telephone 3 that is changing base stations 5 will be referred to as a UE, the source base station 5-1 will be referred to as the source eNodeB and the target base station 5-2 will be referred to as the target eNodeB.

Figure 4A:
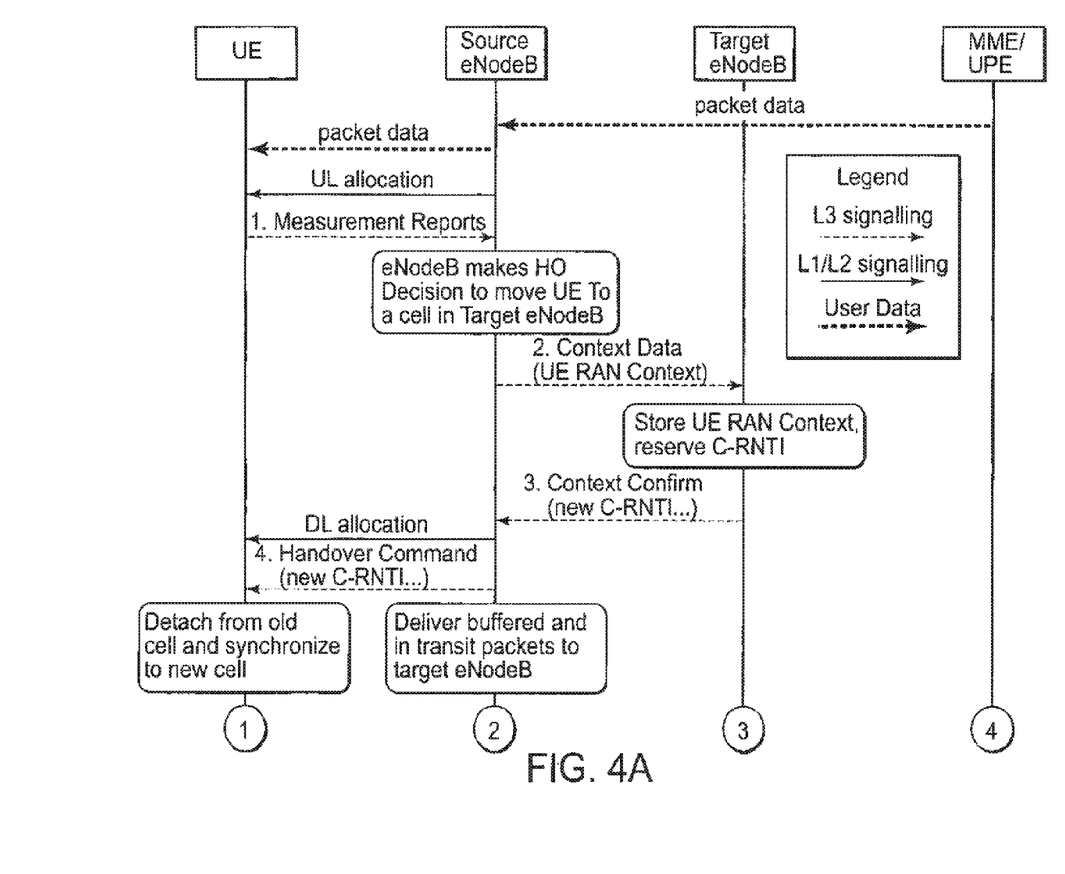
FIGS. 4A and 4B illustrate a conventional handover process.
Figure 4B:
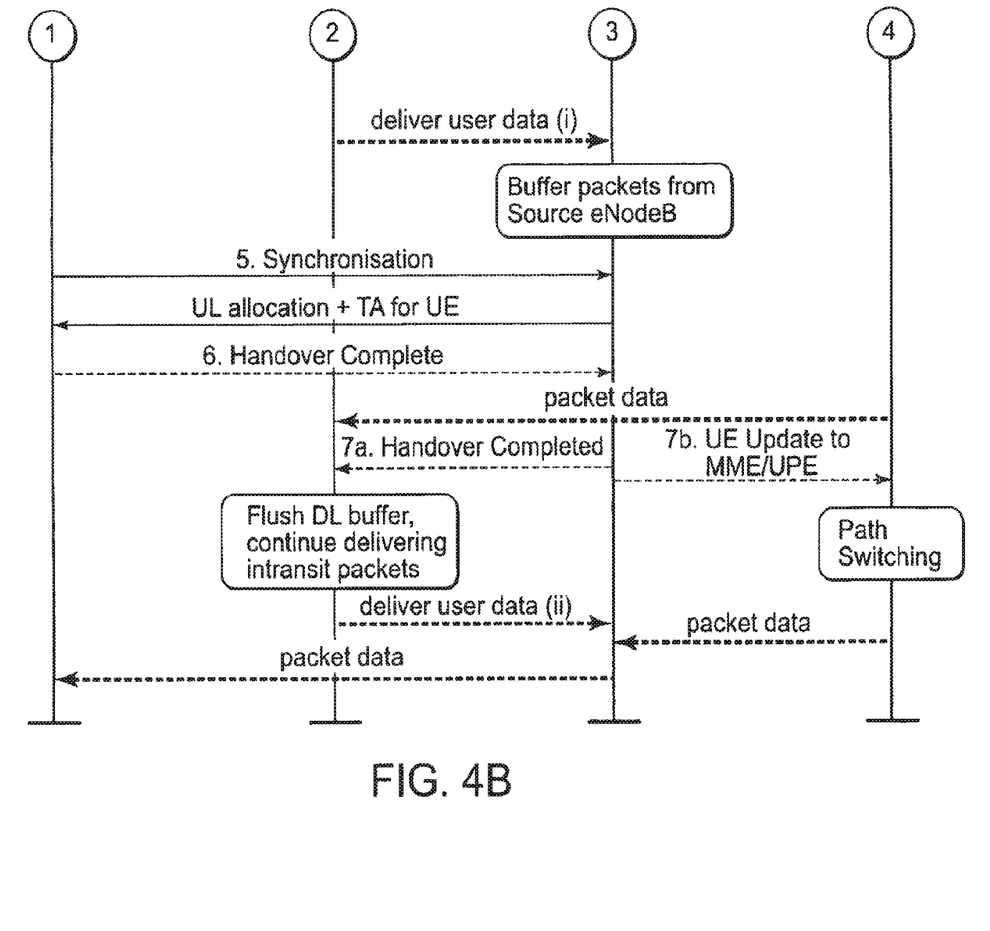

FIGS. 4A and 4B illustrate the currently agreed signalling flow for the control plane for the inter eNodeB handover (HO) procedure. As shown, the sequence proceeds as follows:

1. UE is triggered to send MEASUREMENT REPORTS by the rules set i.e. by system information, specification etc.

2. Source eNodeB makes a decision based on the MEASUREMENT REPORTS and RRM (Radio Resource Management) information to hand off the UE to a target eNodeB. The source eNodeB prepares the target eNodeB for handover and passes relevant information in the Handover Request. Relevant information includes the QoS profiles of the System Architecture Evolution (SAE) bearers and possibly the Access Stratum (AS) configurations (i.e. RLC, MAC layer configurations) of these bearers.

3. The Target eNodeB prepares for HO with L1/L2 and responds to the source eNodeB by providing a new Cell-Radio Network Temporary Identifier (C-RNTI), which is used for identifying each UE within a cell uniquely, and possibly some other parameters i.e. access parameters, System Information Blocks (SIBs), etc. After reception of the accepted preparation of HO, the source eNodeB starts forwarding user data packets to the target eNodeB.

4. The UE receives the HANDOVER (HO) COMMAND with necessary parameters e.g. the new C-RNTI, possible starting time, target eNodeB, SIBs etc. Although not shown in FIGS. 4A and 4B, the UE may acknowledge reception of the HO COMMAND with an RLC acknowledgment procedure.

5. After expiry of the starting time defined in the HO COMMAND, the UE stops its uplink transmissions, performs synchronisation to the target eNodeB and then starts acquiring UL timing advance (TA).

6. The target eNodeB responds with the UL allocation and timing advance information. These are used by the UE to send a HANDOVER COMPLETE message to the target eNodeB, which completes the handover procedure for the UE. Although not shown, the target eNodeB may acknowledge reception of the HO COMPLETE with an RLC acknowledgment procedure.

7a. The target eNodeB informs success of the HO to the source eNodeB, which can then clear already forwarded data from its buffers. The source eNodeB still continues forwarding UE data if it has some in its buffers or if the network User Plane Entity (UPE) still forwards data to it.

7b. The target eNodeB updates the UE location information to the network Mobility Management Entity (MME)/UPE so that the UPE will forward the appropriate user packets directly to the target eNodeB.

Detailed Look at Handover Procedure

The handover execution phase begins in the UE on receiving the RRC Handover Command in step 4 form the source eNodeB. On receiving the Handover Command the UE stops the uplink transmission, starts buffering the uplink packets, detaches from the old cell and attempts synchronisation to the target cell in Step 5.

After the UE attains uplink synchronisation, the target eNodeB responds with an uplink allocation for sending a Handover Complete message. The UE sends the Handover Complete Message in Step 6 which completes the HO procedure in the UE.

After the reception of the Handover Complete Message in the target eNodeB, it makes an appropriate allocation of the resources for the downlink U-plane data, based on the status of downlink buffers and the QoS parameters received from the source eNodeB (which identify the service that was being provided to the UE by the source eNodeB). The target eNodeB has to allocate uplink U-plane resources for the UE. It could do this based on a guess of the uplink buffer status within the UE and the QoS parameters. However, such uplink U-plane resource allocations within the target cell immediately after handover would be suboptimal considering that the UE was unable to perform any UL transmissions while it was trying to synchronize with the target cell. During the time that the UE can not transmit uplink data, it buffers the data in its internal buffers 89. By the time that the UE is able to send uplink data to the target eNodeB, there may be a large number of uplink data packets sitting in the uplink buffers 89. In order that the UE can quickly bring its buffers levels down, the target eNodeB must allocate sufficient resources in the target cell for this unlink U-plane data.

Although the handover execution procedure described above is for inter eNodeB handover scenarios, it is equally applicable for intra eNodeB handovers as far as the scheduling and resource allocation in the UL is concerned.

As an alternative to guessing the required uplink resource needs, the target eNodeB may make an initial allocation to the UE based on the last buffer status report sent by the UE to the source eNodeB and the QoS parameters. The UE can subsequently request additional uplink resources by sending an uplink buffer Status report to bring down the increased buffer levels due to the pause in the uplink transmission. However, this requires the source eNodeB to have to store the most recent uplink buffer status report for each UE and transfer it to the target eNodeB during the handover procedure.

Figure 5A:
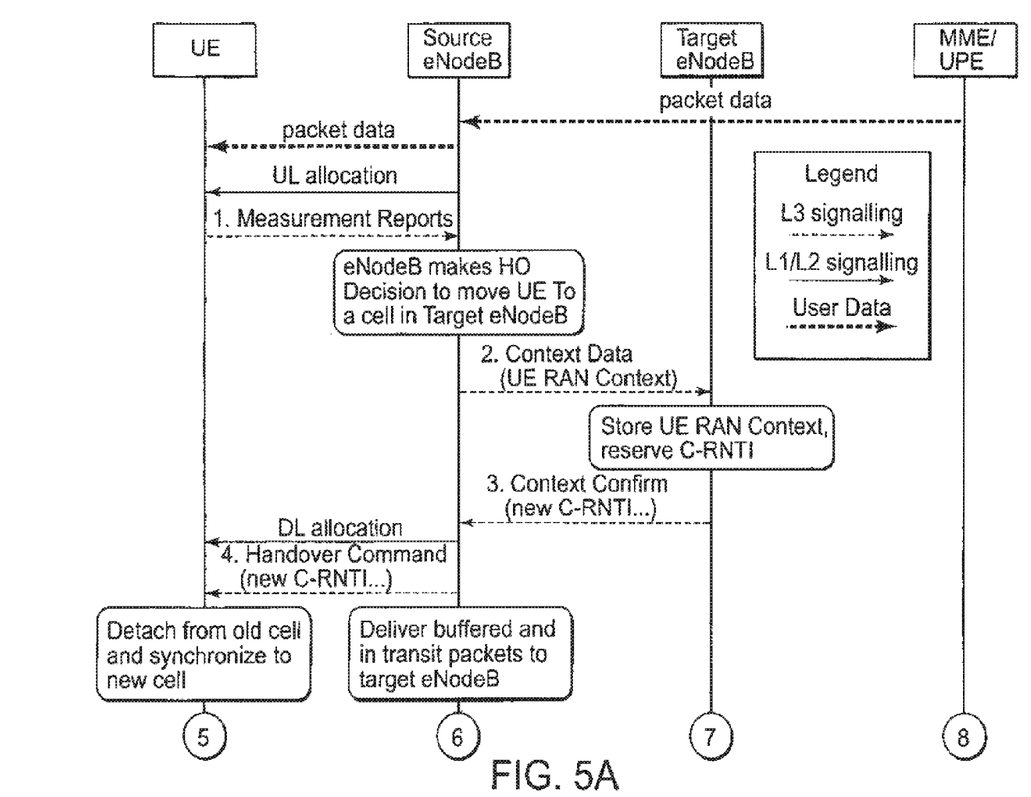
FIGS. 5A and 5B show a modified handover process.
Figure 5B:
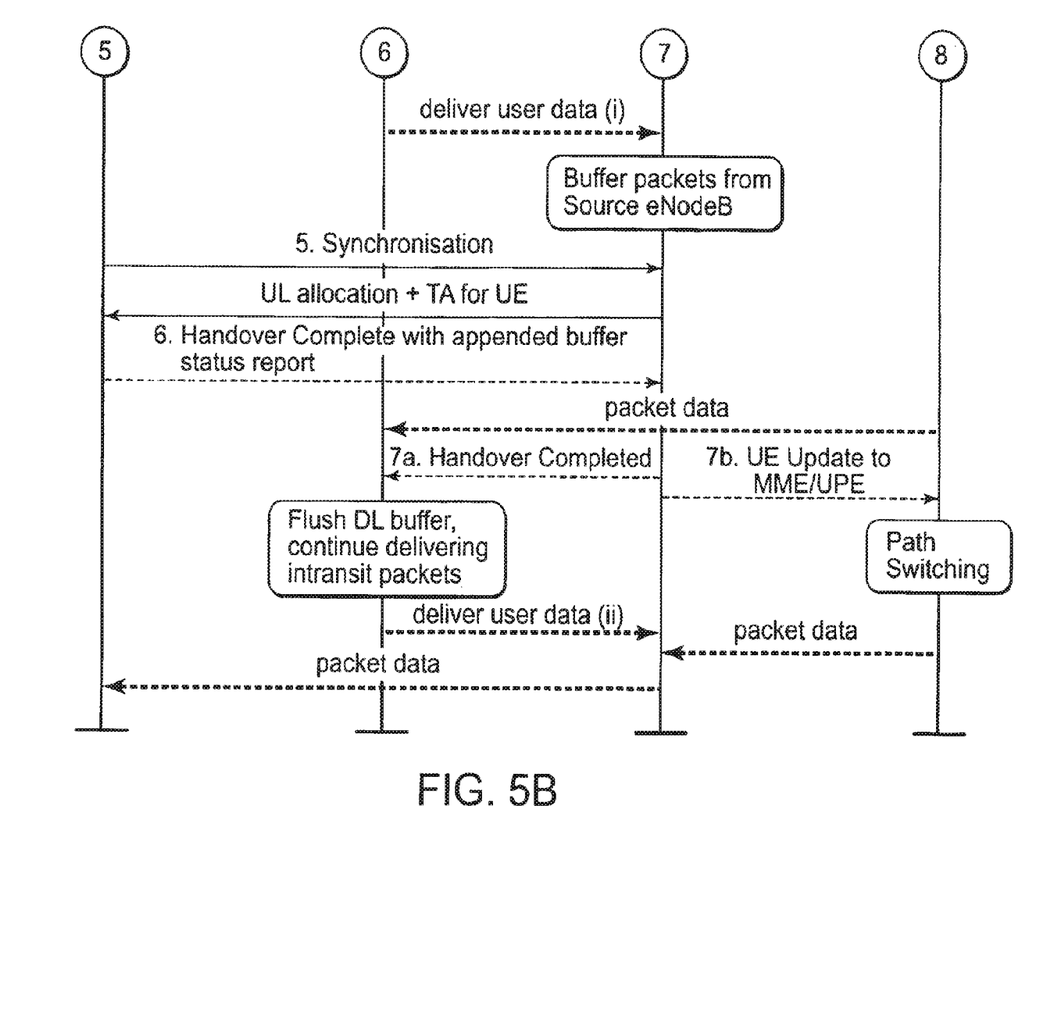

Therefore, in the preferred embodiment, the handover procedure described above is modified slightly such that when the UE sends the HANDOVER COMPLETE message, it appends to that message the latest uplink buffer status report. The target eNodeB can then use this information to allocate accurately the required uplink resources that are needed by the UE. This modified handover procedure is illustrated in FIGS. 5A and 5B and has a number of advantages over the other techniques discussed above:

1. For Inter eNodeB handovers, the source eNodeB does not need to store the most recent UL buffer status report for each UE and transfer it to the target eNodeB. This results in reduced memory requirements on the eNodeBs and reduces the signalling load on the X2 interface between the eNodeBs.

2. For Intra eNodeB handovers, the buffer status reports do not need to be stored and transferred from the source to target cell UL scheduling entity.

3. Because an accurate allocation of the uplink resources is performed immediately after handover, there is no need for the UE to request more resources, resulting in lower L2 signalling overhead.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiment, a mobile telephone based telecommunications system was described. As those skilled in the art will appreciate, the handover techniques described in the present application can be employed in any communications system. In particular, many of these handover techniques can be used in wire or wireless based communications systems which either use electromagnetic signals or acoustic signals to carry the data. In the general case, the base stations and the mobile telephones can be considered as communications nodes or devices which communicate with each other. In intra eNodeB handover, the source and target communications nodes will be formed by respective scheduling entities within one base station. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Glossary of 3GPP Terms

LTE—Long Term Evolution (of UTRAN)

eNodeB—E-UTRAN Node B

UE—User Equipment-mobile communication device

DL—downlink—link from base to mobile

UL—uplink—link from mobile to base

MME—Mobility Management Entity

UPE—User Plane Entity

HO—Handover

RLC—Radio Link Control

RRC—Radio Resource Control

RRM—Radio Resource Management

SAE—System Architecture Evolution

C-RNT—Cell-Radio Network Temporary Identifier

SIB—System Information Block

U-plane—User Plane

X2 Interface—Interface between two eNodeB

The following is a detailed description of the way in which the present invention may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

The signalling sequence for the intra-LTE handover procedure has been captured in TS 36.300, however the specifics on resource allocations in the target cell have not yet been addressed in detail. In this contribution we address some further details on the UL resource allocation in the target cell after Handover and handling of UL buffer status report.

Discussion

Studying a "typical" signalling flow for mobility, we can see that the handover procedure consist of the following: radio conditions are changing, UE sends a measurement report, the network takes a decision and prepares the target cell, the network commands the UE to change cell, the UE reconfigures L1 and synchronizes to the target cell, data is transmitted and received in the target cell and resources in the source cell are released.

The signalling flow for the control plane that was agreed for inter eNodeB handover procedure is recapitulated and is taken as the basis for further discussion. The description from draft Stage 2 TS for the signalling sequence is also included.

Below is more detailed description of the intra-MME/UPE HO procedure:

1. UE is triggered to send MEASUREMENT REPORT by the rules set by i.e. system information, specification etc.

2. Source eNB makes decision based on MEASUREMENT REPORT and RRM information to hand off UE. The eNB prepares target eNB for handover and passes relevant information in the Handover Request. Relevant information includes the QoS profiles of the SAE bearers and possibly the AS configurations of these bearers (FFS).

3. Target eNB prepares HO with L1/L2 and responds to source eNB by providing new C-RNTI and possibly some other parameters i.e. access parameters, SIBs, etc. After reception of accepted preparation of HO, source eNB starts forwarding data packets to target eNB.

4. UE receives HANDOVER COMMAND with necessary parameters i.e. new C-RNTI, possible starting time, target eNB SIBs etc. It is probable that UE needs to acknowledge reception of the HO COMMAND with RLC acknowledgment procedure.

5. After expiry of starting time in HO COMMAND, UE performs synchronisation to target eNB and then starts acquiring UL timing advance.

6. Network responds with UL allocation and timing advance. These are used by UE to send HANDOVER COMPLETE to the target eNB, which completes handover procedure for the UE. It is probable that NW needs to acknowledge reception of the HO COMPLETE with RLC acknowledgment procedure.

7a. Target eNB informs success of HO to source eNB, which can then clear already forwarded data from its buffers. Source eNB still continues forwarding UE data if it has some in its buffers or if UPE still forwards data to it.

7b. UE location information is updated to MME/UPE in order to enable UPE to forward packets directly to target eNB.

4.1. Detailed Look at Handover Execution Procedure

The handover execution phase begins in the UE on receiving the RRC Handover Command in step 4 form the source eNodeB. On receiving the Handover Command the UE shall stop the UL transmission, start buffering the UL packets, detach from the old cell and shall attempt to synchronisation to target cell in Step 5.

After the UE attains UL synchronisation, eNodeB will respond with UL allocation for sending Handover Complete message. The UE shall send the Handover Complete Message in Step 6 which will complete the HO procedure in UE.

After the reception of Handover Complete Message in the target eNodeB, it shall appropriately allocate the resources for DL-U plane data based on the status of DL buffers and the QoS parameters received from source eNodeB. However for the UL-U plane data, the target eNodeB could allocate resources based on a guess of the buffer status in the UL within UE and the QoS parameters. Such UL-U plane resource allocations within the target cell immediately after HO would be suboptimal considering the fact that the UE was unable to perform any UL transmissions while it was trying to synchronize with the target cell. This can cause large amount of UL data packets to be buffered within the UE during the Hand over execution phase and the buffers levels need to be quickly brought down by allocating the sufficient amount of resources for UL-U plane data in the target cell.

Although the handover execution procedure described above is for inter eNB hand over scenarios, it is equally applicable for the intra eNB handover as far as the scheduling and resource allocation in UL is concerned.

4.2. Resource Allocation in UL After HO

Considering the above aspects, it is necessary that the appropriate amount of UL resources for U-plane data is allocated in the target cell immediately after handover execution phase. Possible ways of achieving this is to have either a two step approach or a one step approach described below:

Two Step Approach

Step 1: Initially UL Resources are allocated in the target cell based on the last buffer status report sent by the UE in the source cell and the QoS parameters.

Step 2: UE shall subsequently request additional UL resources subsequently by sending UL buffer Status report to bring down the increased buffer levels due to pause in UL transmission.

One Step Approach

Step 1: UE sends the UL buffer status report along with the Handover Complete Message and the eNB allocates the UL resources accordingly.

On comparing the two approaches, we believe that one step approaches has significant advantages over the two step approach.

With one step approach we see the following advantages

1. For Inter eNodeB HO, source eNodeB doesn't need to store the most recent UL buffer status report for each UE and transfer it to the target eNodeB during inter eNodeB handover. This would result in reduced memory requirements and reduction of signalling load on X2 interface.

2. Similarly for intra eNB handover, the buffer status report doesn't have to be stored and transferred from the source to target cell UL scheduling entity.

3. Because an accurate allocation of the uplink resources is performed immediately after handover, there is no need for the UE to request more resources, resulting in lower L2 signalling overhead.

CONCLUSIONS

In this paper we take a detailed look at the handover execution phase and suggest a handling of UL Buffer status report and UL resource allocation in the target cell.

At the beginning of Handover execution phase, (i.e. on reception of Handover Command) the UE stops the UL transmissions and attempts to synchronize with the target cell. The buffers in the UE would keep accumulating the data packets till the UE receives the UL grants after the HO in the target cell. It is necessary that the Network accurately allocates the UL resources in the target cell such that increased buffer levels due to the pause in UL transmission are brought down quickly.

In order to have optimized UL resource allocations in the target cell, we propose that the UL Buffer Status Report is transmitted by the UE along with the Hand over Complete Message. This would eliminate the need for the storing the most recent UL Buffer status report and transferring it to the target cell/eNodeB MAC entity during handovers.

It is proposed to capture the important points from the discussion and include it in TS 36.300 form this paper.

This application is based upon and claims the benefit of priority from United Kingdom patent application No. 0702169.4, filed on Feb. 5, 2007, the disclosure of which is incorporated herein in its entirety by reference.

What is claimed is:

1. A communications device which communicates with a target communications node, the communications device comprising:
   a memory storing instructions; and
   one or more processors configured to execute the instructions to:
   receive Cell-Radio Network Temporary Identifier (C-RNTI) before the communications device synchronizes with the target communications node;
   transmit a handover complete message together with a buffer status report to the target communications node, wherein the buffer status report comprises information of an amount of buffered uplink data stored in an uplink data buffer; and
   transmit uplink data to the target communications node using an initial resource, for transmission of the uplink data, allocated by the target communications node based on the buffer status report, after the handover complete message has been transmitted together with the buffer status report.

2. A target communications node which communicates with a communications device, the target communications node comprising:
   a memory storing instructions; and
   one or more processors configured to execute the instructions to:
   transmit Cell-Radio Network Temporary Identifier (C-RNTI) before the communications device synchronizes with the target communications node;
   receive, from the communications device, a handover complete message together with a buffer status report, wherein the buffer status report comprises information of an amount of buffered uplink data stored in an uplink data buffer of the communications device;
   allocate, after receiving the handover complete message together with the buffer status report, an initial resource, for transmission of uplink data to the communications device, based on the buffer status report received with the handover complete message; and
   receive uplink data from the communications device using the allocated initial resource.

3. A method in a communications device which communicates with a target communications node, the method comprising:
   receiving Cell-Radio Network Temporary Identifier (C-RNTI) before the communications device synchronizes with the target communications node;
   transmitting a handover complete message together with a buffer status report to the target communications node, wherein the buffer status report comprises information of an amount of buffered uplink data stored in an uplink data buffer; and
   transmitting uplink data to the target communications node using an initial resource, for transmission of the uplink data, allocated by the target communications node based on the buffer status report, after the handover complete message has been transmitted together with the buffer status report.

4. A method in a target communications node which communicates with a communications device, the method comprising:
   transmitting Cell-Radio Network Temporary Identifier (C-RNTI) before the communications device synchronizes with the target communications node;
   receiving, from the communications device, a handover complete message together with a buffer status report, wherein the buffer status report comprises information of an amount of buffered uplink data stored in an uplink data buffer of the communications device;
   after the receiving the handover complete message together with the buffer status report, allocating an initial resource, for transmission of uplink data to the communications device, based on the buffer status report received with the handover complete message; and
   receiving uplink data from the communications device using the allocated initial resource.

* * * * *